May 15, 1962 — W. B. FELL — 3,034,220
MICRO-PRECISION LEVEL
Filed Dec. 30, 1957
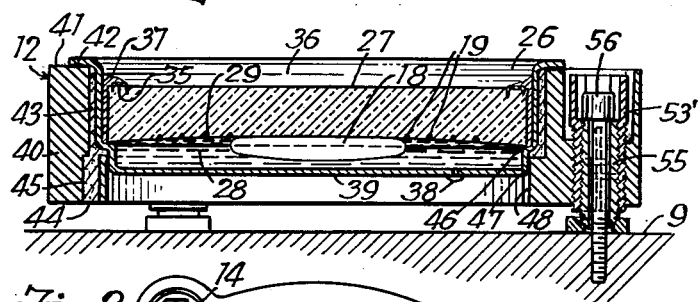
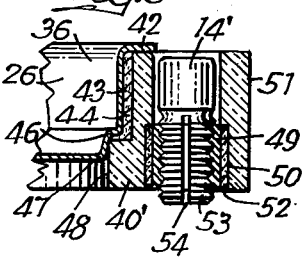
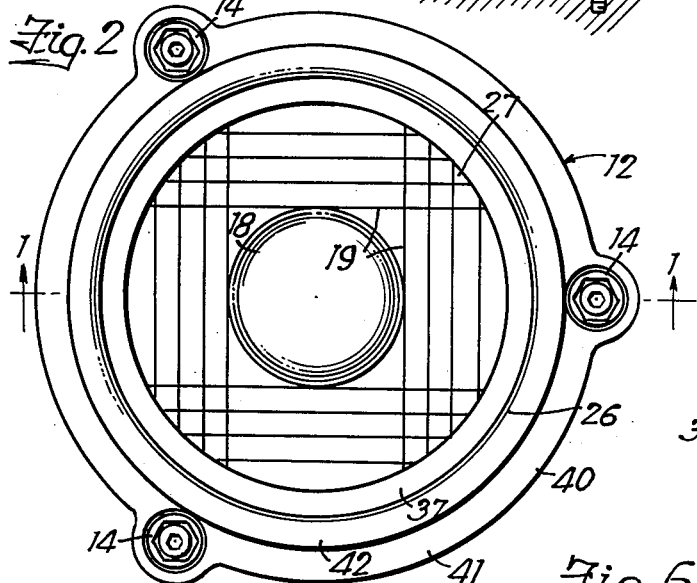
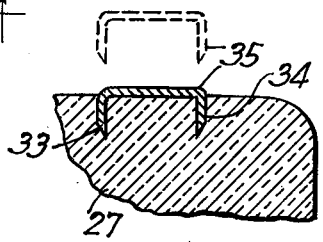
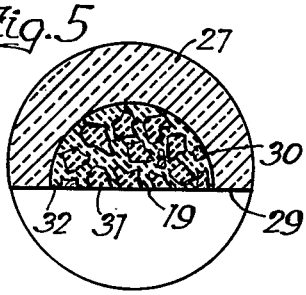
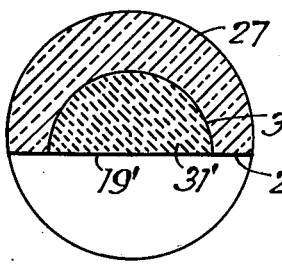
Inventor
William B. Fell
Atty.

United States Patent Office 3,034,220
Patented May 15, 1962

3,034,220
MICRO-PRECISION LEVEL
William B. Fell, 320 McLain Ave., Rockford, Ill.
Filed Dec. 30, 1957, Ser. No. 705,943
12 Claims. (Cl. 33—212)

This invention relates to micro-precision levels and is more particularly concerned with improvements in the circular type of spirit levels disclosed in my Patents No. 2,211,201 and No. 2,316,777.

The principal object of my invention is to provide a precision level of generally improved design and construction for greater sensitivity and accuracy, the improvements being more specifically along the following lines:

(1) The thin-walled sheet metal cup which, as shown in my Patent No. 2,316,777, serves as the container for the liquid with the large circular air bubble therein that moves with respect to a spherical surface on the underside of the glass or quartz disk, was heretofore supported on an annular shoulder in the holder and the annular space around the cup was filled with plaster of Paris from above, but, in accordance with the present invention, a much better and neater assembly is obtained and more easily and in much less time by providing an annular flange on the top of the cup that rests on top of the holder for support, the annular space around the cup in the holder being filled with plaster of Paris while the assembly is inverted, with the result that this plaster is not exposed at the top of the assembly in its normal position and yet the cup is held just as firmly cemented in place as with the old construction, or better, and since it requires much less time and care to complete the assembly a good saving in cost of manufacture is realized.

(2) As described in my copending application, Serial No. 589,731, filed June 6, 1956, I use fused quartz for the cover disk or lens in lieu of ordinary plate glass with a view to greater accuracy, because fused quartz has a much lower temperature coefficient of expansion than either plate glass or Pyrex, and in a micro-precision level it is important to minimize expansion or contraction with temperature change, and, in accordance with the present invention, I provide the sheet metal cup of Invar, which is a 36% nickel-steel alloy having substantially the same temperature coefficient of expansion as fused quartz, with a view to obtaining better ultimate accuracy by virtue of the expansion and contraction of the cup uniformly with the fused quartz disk that is secured to the rim portion of the cup, usually by soldering.

(3) The use of fused quartz for the cover disk or lens, as disclosed in the copending application referred to, presents a problem because of the high temperature of fusion of quartz, and to simplify matters in soldering the fuzed quartz disk into the cup I provide a ring of channel section that is pressed into the top of the quartz disk when the latter is heated up to the temperature of fusion, the ring being of molybdenum, tungsten, or tantalum, capable of withstanding such high temperatures, and the U-shaped section of the ring being of advantage in the pressing of the ring home with atmospheric pressure after the embedding of the ring has been started in a vacuum.

(4) The use of fused quartz for the cover disk or lens also presented a problem in regard to the provision of graduation lines, because when lines are cut in the fused quartz and filled with any of the available glass enamels, the enamels, due to their greater temperature coefficient of expansion caused the quartz to craze, and to remedy this difficulty, I devised two solutions:

(a) filling the graduation grooves with milled fused quartz cemented together with lower melting point glass enamel, using two or three parts of quartz powder to one of enamel powder and heating the mixture enough to melt the enamel but not the quartz, the molten mixture filling the grooves, any surplus being ground off flush with the surface after cooling, and (b) using milled opaque fused quartz, the grooves are filled to excess and fired over as by the fire polish method and the surplus fill ground off flush with the surface.

(5) To reduce the overall weight of the level and still not sacrifice anything in the way of accuracy, I may make the mounting ring of porcelain and have metallic bushings cemented in place in holes provided where the adjustable mounting screws are located, the porcelain having a low temperature coefficient of expansion and accordingly further increasing the accuracy and sensitivity of the level.

The invention is illustrated in the accompanying drawings in which—

FIG. 1 is a vertical section on the line 1—1 of FIG. 2 through a micro-precision level made in accordance with my invention;

FIG. 2 is a plan view of FIG. 1;

FIG. 3 is a sectional detail corresponding to a portion of FIG. 1, showing a modified or alternative construction in which the mounting ring is non-metallic;

FIG. 4 is an enlarged sectional detail corresponding to a portion of FIG. 1, showing the metallic ring of channel section providing a metal to quartz seal or metal to glass seal, and FIGS. 5 and 6 are enlarged sectional details showing two different fills in the graduation line grooves, either of which may be provided in accordance with my invention to prevent crazing of the quartz.

Similar reference numerals are applied to corresponding parts throughout the views.

Referring to the drawings and particularly FIGS. 1 and 2, the reference numeral 9 designates the portable frame or base for the level, which, like that of my Patent No. 2,316,777, is of hollow cast iron construction and generally rectangular in form, having hand holes in its opposite ends for convenience in lifting the instrument out of its carrying case and placing it on the work and moving it from place to place. The bottom of the base is flat so as to be adapted to rest, for example, on the flat top of the bed of a machine to be levelled, and the level unit, indicated generally by the reference numeral 12, is mounted in the center of the base in an enclosed compartment on three evenly circumferentially spaced adjustable supports 14, which form the subject matter of my copending application, Serial No. 663,678, filed June 5, 1957. The level will be accurately adjusted by the level manufacturer at the time the instrument is assembled, and should not thereafter require much, if any, adjustment of the supports 14. It will be understood, however, that a level unit 12 may also be adjustably supported, as shown at 14, in a fixed support on a machine or instrument equipped with a level of the kind herein disclosed, there being various machines and instruments, such as astronomical, surveying, physical, etc., requiring accurate levelling, for which a level as sensitive and accurate as the one herein disclosed is suitable.

The level unit 12, as shown in FIG. 1, consists of a circular sheet metal cup 26, a circular fused quartz cover disk or lens 27, and an ether pool 28 therebeneath in which the air bubble 18 operates, the latter being movable relative to the spherically concave bottom surface 29 of the disk 27, which gives the bubble the circular form shown. The spherical concavity of the bottom surface 29 is very slight, being generated on a long radius from a center on the vertical axis of the spherical surface through the center of the disk 27. The graduation lines 19, which extend at right angles to one another and are disposed substantially parallel to the edges of the base 9, are all scribed to the same depth in the bottom surface 29 before the same is ground accurately to the final spherically concave form, and deep enough so as not to be obliterated by this grinding. In accordance with my invention, the graduation lines 19 are provided in the fused quartz disk 27 by either of two methods illustrated in FIGS. 5 and 6 at 19 and 19', respectively.

In FIG. 5, the groove 30 cut in the fused quartz 27 where the graduation line is to be provided is filled with milled fused quartz particles 31 cemented together with glass enamel 32 having a relatively lower melting point, the grooves 30 for all of the lines 19 being filled to excess with the fluid mixture of two or three parts of quartz powder to one of enamel powder, in which only the enamel powder, which has a lower melting point, is melted, the whole surface, where the lines are, being covered and the excess being ground off flush with the surface 29 after the enamel has cooled and hardened, the resulting fill having the enamel sufficiently dispersed by the fused quartz particles to prevent crazing of the fused quartz in the disk 27.

FIG. 6 illustrates the other solution to the problem of defining the graduation lines 19', in which the grooves 30' are filled with milled fused quartz alone, indicated at 31', using opaque quartz to contrast with the clear fused quartz of the disk 27, after which the area is fired over as by the fire polish method, and then ground flush with surface 29.

Depending upon the radius of curvature of surface 29, as well as the spacing of lines 19 or 19', each scale division of the closely spaced graduation lines may be scaled to measure from one to say five ten-thousandths of an inch of movement in one linear foot so that errors may be read directly either in seconds of a degree or in ten-thousandths of an inch to the foot in any direction. The finer level measurements mentioned are for the astrophysical and geophysical applications. Such closeness of measurement, however, is usually not necessary in machine tool work and various other applications. Increased sensitivity and greater accuracy is obtainable by an increase in the radius of the spherical bottom surface 29 appreciably over that used in the glass cover disk in the level construction of my Patent No. 2,316,777, and that is made practical only by virtue of the use of fused quartz for disk 27, fused quartz having a much lower temperature coefficient of expansion than either plate glass or Pyrex, its coefficient being approximately $\frac{1}{18}$ that of plate glass and $\frac{1}{6}$ that of Pyrex. In other words, the concavity at 29 is much shallower in the present construction than in that of my Patent No. 2,316,777, despite how the concavity is shown in the present drawing for purposes of better illustration and obviously to avoid giving the impression that the surface 29 is flat. In FIG. 2 the bubble 18 is shown in the exact center with the innermost graduation lines 19 tangent thereto and it is obvious that any out of level condition can be detected at once by a shift in the position of the bubble with respect to these lines and one may level the surface with one setting instead of having to move the level several times in positions at right angles to one another as was necessary with tubular levels. The fact that the bubble 18 moves relative to the spherically concave surface 29 directly under the graduation lines 19 or 19' obviously makes for the best obtainable accuracy and closest reading possible. Inasmuch as it is a difficult matter in quantity production of levels to fuse a metal ring to a fused quartz disk for a seal comparable to that disclosed in my Patent No. 2,316,777, wherein a metal ring is fused to a cover glass and is soldered to the cup, I impress into the top of the cover disk 27 the annular flanges 33 and 34 of a thin metal ring 35 formed to a channel or U-shaped section, as shown in FIG. 4. It will, of course, be understood that the same construction is also applicable to a cover disk of plate glass or Pyrex. The ring is placed over the disk, as indicated in dotted lines in FIG. 4, and the ring and disk are heated together by induction in a vacuum, air pressure being restored while the disk is still melted next to the metal, so that this pressure helps to close any remaining space between the web of the channel and the disk. The ring 35 is slightly smaller in diameter than the disk, as clearly appears in FIGS. 1 and 4, and its U-shaped section, I have found, is of advantage not only in the application of the ring to the cover disk, as described, but also in relieving strains caused by the difference in coefficients of expansion. The ring is generally about $\frac{1}{8}$ of an inch wide and of a diameter about $\frac{1}{4}$ inch smaller than the cover disk and disposed concentric therewith. The flanges should be about $\frac{1}{16}''$ long. The ring is quite thin, that is to say, about .001" thick. The ring may be of molybdenum, tungsten or tantalum, to withstand the high temperatures involved in melting the fused quartz. The disk 27 with the ring 35 secured therein in the manner described is then secured to the rim portion 36 of the metal cup 26 by soldering, as indicated at 37, enough solder finding its way between the periphery of the disk 27 and the rim of the cup to hold the disk tightly in position while the solder also serves to provide a hermetic seal. At 38 is indicated a drop of solder applied to close a small filling opening in the bottom 39 of the cup after the chamber in the bottom portion of the cup has been filled with the liquid ether or other fluid medium indicated at 28 employed in conjunction with the air bubble 18.

The cast iron circular frame 40 in which the cup 26 is mounted has a flat top surface 41 on which an outwardly projecting annular flange 42 provided on the top of the cup 26 rests to form the top wall of an annular chamber 43. This is filled with plaster of Paris, as indicated at 44 through a bottom filler opening 45 that communicates with the chamber 43, whereby to cement the cup in place. The annular shoulder 46 in cup 26 on which the disk 27 rests is defined by a reduction in diameter of the lower portion 47 of the cup and this portion fits in the reduced portion 48 of the bore of the frame 40 to center the cup neatly with respect to the frame 40 while at the same time closing the bottom of the space 43 to retain the plaster of Paris. With this construction, the filling of plaster of Paris is injected from what is later the bottom of the level unit 12 when the assembly is inverted, and as a result there is an appreciable saving in time and manufacturing cost in the completion of the assembly over filling in the plaster of Paris from above, as shown in my Patent No. 2,316,777, and the present construction is furthermore much neater in appearance.

The cup 26 is preferably of Invar, which is a 36% nickel-steel alloy having substantially the same temperature coefficient of expansion as fused quartz, with a view to obtaining better ultimate accuracy by virtue of the expansion and contraction of the cup uniformly with the fused quartz disk 27, the two parts mentioned being secured together, as described above by soldering, as shown at 37.

The circular frame in which the cup 26 is mounted may be made of porcelain, as indicated at 40' in FIG. 3, but otherwise the same as the frame 40, so as to support the cup 26 by its flange 42 in the same way and have the cup centered in the same way, as indicated at 47—48, and have the annular space 43 between the cup and frame filled from the bottom through a filler opening 45 with plaster of Paris to cement the cup in place in the frame. The low temperature coefficient of expansion of porcelain is advantageous in a micro-precision level because the frame will not be affected to any appreciable extent by the temperature of the room in which the level may be used and consequently errors will not arise by reason of expansion and contraction of the frame relative to the cup. The only difference which the use of this non-metallic material in the frame necessitates is the mounting of metallic bushings 49 in holes 50 in the three radial extensions 51 where the adjustable supports 14' are provided in equally circumferentially spaced relation relative to the frame 40', the metallic bushings 49 being suitably cemented in place in the holes 50, as indicated at 52. The screw threaded sleeve shown at 53, in other words, which has its internally and externally threaded portion split longitudinally diametrically, as shown at 54, corresponding to the screw 53' of FIG. 1, inside which the transversely slotted screw 55 is threaded and arranged to be compressed longitudinally by the tightening of a through-bolt 56, as described in the copending application, Serial No. 663,678, mentioned above. Obviously, the metallic bushing 49 and cement 52 will assume whatever strains are imposed by reason of the expansion of sleeve screw 53 in the tightening of bolt 56 so that there is no danger of cracking the porcelain of frame 40'.

It is believed the foregoing description conveys a good understanding of the objects and advantages of my invention. The appended claims have been drawn to cover all legitimate modifications and adaptations.

I claim:

1. A spirit level comprising in combination, a circular cup containing a pool of liquid with an air bubble floating thereon, a circular cover glass hermetically sealed in said cup over and in contact with the pool and bubble and having a flat top surface and a concave bottom surface, the latter surface being spherically conformed on a large radius in relation to the radius of the cup and giving circular form to the bubble, said cup having an annular top supporting flange, a supporting frame whereon said flange rests having a circular opening provided therein to receive said cup that is larger in diameter than said cup but smaller in diameter than said flange, whereby to define an annular chamber in the opening in said frame around said cup below said flange to which chamber access may be had from the bottom of the frame to permit filling the same from above with cement in plastic form when the assembly is inverted and resting on said flange, and a filling of suitable cement in said annular chamber securing said cup in place in said frame in substantially concentric relationship thereto.

2. A spirit level as defined in claim 1 wherein the opening in said frame is closed at the bottom, said frame having a filler opening provided therein extending from the bottom to and communicating with the annular chamber, whereby to permit entry of the filling of cement in plastic form into said chamber through said filler opening.

3. A spirit level as defined in claim 1 wherein the opening in said frame has a reduced concentric lower end portion and said cup has a concentric lower end portion of a diameter to fit in and close said reduced opening, whereby to close the lower end of said annular chamber and positively locate the cup in concentric relationship to said frame before the cement is filled in around the cup, said frame having a filler opening provided therein extending from the bottom to and communicating with the annular chamber, whereby to permit entry of the filling of cement in plastic form into said chamber through said filler opening.

4. A spirit level as defined in claim 1 wherein the opening in said frame has a reduced concentric lower end portion and said cup has a concentric lower end portion of reduced diameter to enter and close said opening, whereby to close the lower end of said annular chamber and positively locate the cup in concentric relationship to said frame before the cement is filled in around the cup, and there being an annular shoulder defined in said cup above the reduced lower end portion wherein the cover glass is supported, the cover glass being of reduced diameter in relation to the internal diameter of the cup above said shoulder, and the hermetical seal including a filling for the annular space in said cup around said cover glass, said frame having a filler opening provided therein extending from the bottom to and communicating with the annular chamber, whereby to permit entry of the filling of cement in plastic form into said chamber through said filler opening.

5. A leveling instrument comprising in combination, a circular cup member, and a circular cover glass of fused quartz disposed in said cup and hermetically sealed therein by soldering the two parts together peripherally, said cover glass having a flat top surface and concave bottom surface, the latter being spherically conformed on a radius that is very large in relation to the radius of said cover glass, so that the concave bottom surface is nearly flat and the level is very sensitive to even slight distortion of the cover glass, said cover glass defining the top of a chamber in said cup receiving a pool of liquid with an air bubble floating thereon, the air bubble being given circular form by contact of the liquid and bubble with the bottom of said cover glass, said cup member being of Invar which has substantially the same temperature coefficient of expansion as said fused quartz cover glass, whereby the two parts expand and contract uniformly with temperature change and better ultimate accuracy is accordingly obtained with the levelling instrument, due to the reduction of radial distortion of the cover glass to a minimum.

6. A levelling instrument as set forth in claim 7 wherein said cup has the lower end portion thereof of reduced diameter and concentric with the upper end portion, whereby an annular shoulder of uniform width is defined inside said cup above the bottom whereon the cover glass is supported, the cover glass being of reduced diameter in relation to the internal diameter of the cup above said annular shoulder, whereby an annular space is defined in the cup around the cover glass to receive the solder for the hermetical seal.

7. In the manufacture of a levelling instrument, comprising a cover glass having a top surface to which a metal ring of channel section having parallel downwardly projecting annular flanges is to be secured by impression of the flanges into said cover glass, the method comprising heating said cover glass to the temperature of fusion in a vacuum while the ring is resting by means of at least one of its flanges on top thereof, and then relieving the vacuum, whereby the flanges are first partially impressed into the cover glass by gravity and thereafter atmospheric pressure helps to complete the impression when the vacuum is relieved.

8. In the manufacture of a levelling instrument of the character described, comprising a cover glass of fused quartz having a top surface to which a ring that is about .001" thick and made of metal having substantially the physical characteristics of tantalum is to be secured, said ring being of channel section having inner and outer substantially parallel annular flanges, said ring being applied to the top surface of said cover glass by impression of said flanges into said cover glass, the method comprising heating the ring by induction in a vacuum to the temperature of fusion of quartz while the ring is resting by means of at least one of its flanges on top of the cover glass, and then relieving the vacuum, the ring transmitting heat to the cover glass for fusion and the ring being partially impressed by gravity and being thereafter fully impressed as it is pressed in by atmospheric pressure when the vacuum is relieved.

9. In the manufacture of a levelling instrument of the character described, comprising a cover glass having a top surface to which is to be secured a ring made of metal having substantially the physical characteristics of tantalum, said ring being of channel section having inner and outer substantially parallel annular flanges, said ring being applied to the top surface of said cover glass by impression of said flanges into said cover glass, the method comprising heating said cover glass in a vacuum up to the temperature of fusion while the ring is resting by means of at least one of its flanges on top thereof, the channel section being advantageous in the application of the ring to the cover glass since the method further includes induction heating of the ring while in heat transfer contact with the cover glass in a vacuum, and the method further including relieving the vacuum after the predetermined heating, whereby the flanges are partially impressed by gravity and are thereafter fully impressed as atmospheric pressure serves to complete the impression of the flanges when the vacuum is relieved, said flanges being thin so as to facilitate impression into the cover glass and being flexible so as to absorb the strains caused by the difference in temperature coefficients of expansion of the cover glass and ring materials.

10. In combination, a body of transparent fused quartz having one or more grooves cut in the surface thereof to define a line or lines, and a filling for said groove or grooves consisting of milled transparent fused quartz mixed with lower melting point opaque glass enamel, the mixture being heated enough to melt the enamel but not the quartz, whereby the enamel is sufficiently dispersed by the fused quartz particles to prevent crazing of the fused quartz body, the hardened mixture contrasting sufficiently from the quartz body to define the line or lines.

11. In combination, a body of transparent fused quartz having one or more grooves cut in the surface thereof to define a line or lines, and a filling for said groove or grooves consisting of melted opaque fused quartz, the groove or grooves being filled to excess and fired over to retain the filling, whereby the filling has substantially the same temperature coefficient of expansion as the body so as to prevent crazing of the fused quartz body, the filling contrasting sufficiently from the quartz body to define the line or lines.

12. A levelling instrument comprising in combination, a circular cup member, a circular cover glass of fused quartz hermetically sealed therein by soldering the two parts together peripherally, said cover glass having a flat top surface and concave bottom surface, the latter being spherically conformed on a radius that is very large in relation to the radius of said cover glass, so that the concave bottom surface is nearly flat and the level is very sensitive to even slight distortion of the cover glass, said cover glass defining the top of a chamber in said cup receiving a pool of liquid with an air bubble floating thereon, the air bubble being given circular form by contact of the liquid and bubble with the bottom of said cover glass, said cup member being of Invar which has substantially the same temperature coefficient of expansion as said cover glass of fused quartz, whereby the two parts expand and contract uniformly with temperature change and better ultimate accuracy is obtained with the levelling instrument, and a supporting frame for said cup in which the cup is fixed, said frame being of porcelain whereby the low temperature coefficient of expansion of the porcelain is comparable with the temperature coefficient of expansion of said fused quartz and cup for increased accuracy and sensitivity of the level.

References Cited in the file of this patent

UNITED STATES PATENTS

| | | |
|---|---|---|
| 2,069,135 | Cox | Jan. 26, 1937 |
| 2,316,777 | Fell | Apr. 20, 1943 |

OTHER REFERENCES

"Glass-To-Metal Seals," by J. H. Partridge, published by the Society of Glass Technology, "Elmfield," Northumberland Road, Sheffield, 10, England, 1949, pages 3, 4, 62, and FIGURE 13 at the end of Chapter I. (Copy in the Scientific Library.)

Lang's "Handbook of Chemistry," published by Handbook Publishers, Inc., Sandusky, Ohio, fourth edition, 1941.

UNITED STATES PATENT OFFICE
CERTIFICATE OF CORRECTION

Patent No. 3,034,220                      May 15, 1962

William B. Fell

It is hereby certified that error appears in the above numbered patent requiring correction and that the said Letters Patent should read as corrected below.

Column 6, line 22, for the claim reference numeral "7" read -- 5 --.

Signed and sealed this 28th day of August 1962.

(SEAL)
Attest:

ESTON G. JOHNSON                      DAVID L. LADD

Attesting Officer                      Commissioner of Patents